United States Patent
Yao

(10) Patent No.: US 12,143,850 B2
(45) Date of Patent: Nov. 12, 2024

(54) METHOD FOR PROCESSING RELAX MEASUREMENT PARAMETER UPDATE, AND TERMINAL DEVICE

(71) Applicant: GUANGDONG GENIUS TECHNOLOGY CO., LTD., Dongguan (CN)

(72) Inventor: Sheng Yao, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 20 days.

(21) Appl. No.: 18/145,671

(22) Filed: Dec. 22, 2022

(65) Prior Publication Data

US 2023/0130963 A1   Apr. 27, 2023

Related U.S. Application Data

(63) Continuation of application No. PCT/CN2020/140724, filed on Dec. 29, 2020.

(30) Foreign Application Priority Data

Jun. 29, 2020 (CN) .......................... 202010609495.3

(51) Int. Cl.
   *H04W 24/10* (2009.01)
   *H04B 17/309* (2015.01)
   (Continued)

(52) U.S. Cl.
   CPC .......... *H04W 24/10* (2013.01); *H04B 17/318* (2015.01); *H04B 17/336* (2015.01)

(58) Field of Classification Search
   CPC .... H04W 24/10; H04W 24/08; H04B 17/318; H04B 17/336; H04B 17/309; Y02D 30/70
   See application file for complete search history.

(56) References Cited

U.S. PATENT DOCUMENTS

2004/0220758 A1   11/2004   Barsoukov et al.
2012/0213137 A1*   8/2012   Jeong ................ H04W 52/0235
                                                          370/311
(Continued)

FOREIGN PATENT DOCUMENTS

CN   103037444 A   4/2013
CN   105264941 A   1/2016
(Continued)

OTHER PUBLICATIONS

First Office Action issued in counterpart Chinese Patent Application No. 202010609495.3, dated Mar. 23, 2021.
(Continued)

*Primary Examiner* — Harry H Kim
(74) *Attorney, Agent, or Firm* — Westbridge IP LLC

(57) ABSTRACT

Disclosed by embodiments of the present disclosure are a method for processing a relax measurement parameter update, a terminal device, and a computer-readable storage medium. When a network device changes a relax measurement configuration parameter in system information, the terminal device may still independently determine the use of a new relax measurement configuration parameter according to its own conditions, which perfects protocol implementation and allows the terminal device to have more reasonable performance. The method in the embodiment of the present disclosure includes: receiving, by the terminal device, the system information sent by the network device, the system information including a current relax measurement configuration parameter; under the condition that the current relax measurement configuration parameter is different from a previous relax measurement configuration parameter, when current information of the terminal device meets a preset condition, performing, by the terminal device, first parameter update processing.

3 Claims, 5 Drawing Sheets

(51) Int. Cl.
*H04B 17/318* (2015.01)
*H04B 17/336* (2015.01)
*H04W 24/08* (2009.01)

(56) References Cited

U.S. PATENT DOCUMENTS

| | | | | |
|---|---|---|---|---|
| 2015/0208353 A1* | 7/2015 | Jung | .................. | H04W 52/0254 455/574 |
| 2021/0195517 A1* | 6/2021 | Yang | .................. | H04W 52/0229 |
| 2021/0204216 A1* | 7/2021 | Yang | .................. | H04W 52/0274 |
| 2021/0235344 A1* | 7/2021 | Jung | .................... | H04W 48/20 |
| 2022/0353763 A1* | 11/2022 | Li | ....................... | H04W 36/322 |
| 2023/0078923 A1* | 3/2023 | Shi | .................... | H04W 52/0258 370/311 |
| 2023/0092967 A1* | 3/2023 | Huang | .............. | H04W 36/0085 370/331 |

FOREIGN PATENT DOCUMENTS

| | | |
|---|---|---|
| CN | 110839254 A | 2/2020 |
| CN | 111770529 A | 10/2020 |
| EP | 2667667 A1 | 11/2013 |
| WO | 2019199391 A1 | 10/2019 |
| WO | 2020067763 A1 | 4/2020 |
| WO | 2020089513 A1 | 5/2020 |

OTHER PUBLICATIONS

International Search Report and Written Opinion issued in corresponding PCT Application No. PCT/CN2020/140724, dated Mar. 18, 2021.
Second Office Action issued in counterpart Chinese Patent Application No. 202010609495.3, dated Oct. 11, 2021.
Third Office Action issued in counterpart Chinese Patent Application No. 202010609495.3, dated Feb. 25, 2022.
Examination Report issued in counterpart Singapore Patent Application No. 11202261635Y, dated Jun. 11, 2024.
Notice of Eligibility for Grant issued in counterpart Singapore Patent Application No. 11202261635Y, dated Jun. 11, 2024.
Search Report issued in counterpart Singapore Patent Application No. 11202261635Y, dated Jul. 16, 2024.
CATT, Discussion and Decision on Report of [Post109e#44][PowSav] RRM open issues, R2-2002791, 3GPP TSG-RAN WG2 Meeting #109bis electronic Online, dated Apr. 10, 2024.
ETSI MCC, Approval of Report of 3GPP TSG-RAN#109bis-e meeting, Online, R2-20043xx, 3GPP TSG-RAN WG2 meeting #110-e, dated Apr. 7, 2020.
ETSI MCC, Draft RAN2-109BIS-E MeetingReport V2, 3rd Generation Partnership (3GPP), Mobile Competence Centre, Report of 3GPP TSG RAN2#109bis-e meeting, Online, pp. 153-155, dated May 17, 2020.
Extended European Search Report issued in counterpart Europe Patent Application No. 20943525.4, dated Sep. 24, 2024.

* cited by examiner

METHOD FOR PROCESSING RELAX MEASUREMENT PARAMETER UPDATE, AND TERMINAL DEVICE

CROSS-REFERENCE TO RELATED APPLICATIONS

This application is a continuation of International Application No. PCT/CN2020/140724, filed on Dec. 29, 2020, which claims priority to Chinese Patent Application No. 202010609495.3, filed on Jun. 29, 2020, the entire disclosures of which are incorporated herein by reference.

TECHNICAL FIELD

The present disclosure relates to the field of communications, in particular to a method for processing a relax measurement parameter update, a terminal device, and a computer-readable storage medium.

BACKGROUND

Whether in a connected state or an idle state, to obtain a preferred serving cell, it is necessary for a terminal device to measure adjacent cells around, including cells with a same frequency, cells with different frequencies, and cells with different systems. If more frequent measurement is performed, it is more power-consuming for the terminal device. Therefore, the concept of relax measurement is introduced in the fifth generation (5G) protocol. The relax measurement may reduce frequency points that need to be measured by the terminal device, thereby shortening the measurement time, and prolonging the measurement cycle of periodic measurement. For the 5G terminal device, when it is determined that a condition of low mobility or not at cell edge is met, the relax measurement may be triggered. A relaxed Measurement-r16 (relaxed Meas-r16) parameter of a condition for determining whether the relax measurement can be triggered is included in a system information block2 (SIB2). At present, in the protocol, it is not stipulated whether the terminal device needs to determine whether the relax measurement can be enabled by using a new parameter under the condition that the network device sends a new SIM to a terminal and a relax measurement configuration parameter in the SIB2 is changed after the terminal device accesses to the cell.

SUMMARY

Disclosed by embodiments of the present disclosure are a method for processing a relax measurement parameter update, a terminal device, and a computer-readable storage medium. When a network device changes a relax measurement configuration parameter in system information, the terminal device may still independently determine the use of a new relax measurement configuration parameter according to its own conditions, which perfects protocol implementation, allows the terminal device to have more reasonable performance, and improves the intelligent level of the terminal device.

In view of this, a first aspect of the present disclosure provides a method for processing a relax measurement parameter update, which may include: receiving, by a terminal device, system information sent by a network device, the system information including a current relax measurement configuration parameter; under the condition that the current relax measurement configuration parameter is different from a previous relax measurement configuration parameter, when current information of the terminal device meets a preset condition, performing, by the terminal device, first parameter update processing; and when the current information of the terminal device does not meet the preset condition, performing, by the terminal device, relax measurement by using the previous relax measurement configuration parameter or the current relax measurement configuration parameter, or, performing, by the terminal device, second parameter update processing.

Optionally, in some embodiments of the present disclosure, the current information of the terminal device includes: current remaining power capacity, a current mode, a current state, current signal intensity, current signal quality, or a current signal-to-noise ratio.

Optionally, in some embodiments of the present disclosure, the preset condition met by the current information of the terminal device includes: the current remaining power capacity is lower than or equal to a first power capacity threshold; or, the current mode is a night mode; or, the current state is a static state; or, the current signal intensity is higher than or equal to a first signal intensity threshold; or, the current signal quality is higher than or equal to a first signal quality threshold; or, the current signal-to-noise ratio is greater than or equal to a first signal-to-noise ratio threshold.

Optionally, in some embodiments of the present disclosure, the performing, by the terminal device, first parameter update processing includes:
under the condition that the current relax measurement configuration parameter includes a current search power difference parameter, when the current search power difference parameter is less than a previous search power difference parameter, performing, by the terminal device, relax measurement by using the previous search power difference parameter, and when the current search power difference parameter is greater than or equal to the previous search power difference parameter, performing, by the terminal device, relax measurement by using the current search power difference parameter; or,
under the condition that the current relax measurement configuration parameter includes a current search intensity threshold parameter, when the current search intensity threshold parameter is less than a previous search intensity threshold parameter, performing, by the terminal device, relax measurement by using the current search intensity threshold parameter, and when the current search intensity threshold parameter is greater than or equal to the previous search intensity threshold parameter, performing, by the terminal device, relax measurement by using the previous search intensity threshold parameter; or,
under the condition that the current relax measurement configuration parameter includes a current relax measurement condition parameter, when the current relax measurement condition parameter meets a condition of low mobility or not at cell edge, performing, by the terminal device, relax measurement by using the current relax measurement condition parameter, and when the current relax measurement condition parameter does not meet the condition of low mobility or not at cell edge, performing, by the terminal device, relax measurement by using a previous relax measurement condition parameter; or,
under the condition that the current relax measurement configuration parameter includes a current high priority relax measurement parameter, when the current high priority relax measurement parameter is equal to a preset value, performing, by the terminal device, relax measurement by using the current high priority relax measurement parameter, and when the current high priority relax measurement parameter is not equal to the preset value, performing, by the terminal device, relax measurement by using a previous high priority relax measurement parameter.

Optionally, in some embodiments of the present disclosure, the when the current information of the terminal device does not meet the preset condition, performing, by the terminal device, relax measurement by using the previous relax measurement configuration parameter or the current relax measurement configuration parameter includes: under the condition that the current remaining power capacity of the terminal device is higher than or equal to a second power capacity threshold, and the second power capacity threshold is greater than the first power capacity threshold, or, under the condition that the current mode of the terminal device is not the night mode, or, under the condition that the current state of the terminal device is not the static state, performing, by the terminal device, relax measurement by using the current relax measurement configuration parameter.

Optionally, in some embodiments of the present disclosure, the when the current information of the terminal device does not meet the preset condition, performing, by the terminal device, relax measurement by using the previous relax measurement configuration parameter or the current relax measurement configuration parameter includes:

under the condition that the current signal intensity of the terminal device is lower than or equal to a second signal intensity threshold, and the second signal intensity threshold is less than the first signal intensity threshold, or, under the condition that the current signal quality of the terminal device is lower than or equal to a second signal quality threshold, and the second signal quality threshold is less than the first signal quality threshold, or, under the condition that the current signal-to-noise ratio of the terminal device is less than or equal to a second signal-to-noise ratio threshold, and the second signal-to-noise ratio threshold is less than the first signal-to-noise ratio threshold, performing, by the terminal device, second parameter update processing.

Optionally, in some embodiments of the present disclosure, the performing, by the terminal device, second parameter update processing includes:

under the condition that the current relax measurement configuration parameter includes the current search power difference parameter, when the current search power difference parameter is less than the previous search power difference parameter, performing, by the terminal device, relax measurement by using the current search power difference parameter, and when the current search power difference parameter is greater than or equal to the previous search power difference parameter, performing, by the terminal device, relax measurement by using the previous search power difference parameter; or, under the condition that the current relax measurement configuration parameter includes the current search intensity threshold parameter, when the current search intensity threshold parameter is less than the previous search intensity threshold parameter, performing, by the terminal device, relax measurement by using the previous search intensity threshold parameter, and when the current search intensity threshold parameter is greater than or equal to the previous search intensity threshold parameter, performing, by the terminal device, relax measurement by using the current search intensity threshold parameter; or, under the condition that the current relax measurement configuration parameter includes the current relax measurement condition parameter, when the current relax measurement condition parameter meets the condition of low mobility or not at cell edge, performing, by the terminal device, relax measurement by using the previous relax measurement condition parameter, and when the current relax measurement condition parameter does not meet the condition of low mobility or not at cell edge, performing, by the terminal device, relax measurement by using the current relax measurement condition parameter; or, under the condition that the current relax measurement configuration parameter includes the current high priority relax measurement parameter, when the current high priority relax measurement parameter is equal to a preset value, performing, by the terminal device, relax measurement by using the previous high priority relax measurement parameter, and when the current high priority relax measurement parameter is not equal to the preset value, performing, by the terminal device, relax measurement by using the current high priority relax measurement parameter.

Optionally, in some embodiments of the present disclosure, the when the current information of the terminal device does not meet the preset condition, performing, by the terminal device, relax measurement by using the previous relax measurement configuration parameter or the current relax measurement configuration parameter includes:

under the condition that the current remaining power capacity is higher than the first power capacity threshold and is lower than the second power capacity threshold, or, under the condition that the current signal intensity is higher than the second signal intensity threshold and is lower than the first signal intensity threshold, or, under the condition that the current signal quality is higher than the second signal quality threshold and is lower than the first signal quality threshold, or, under the condition that the current signal-to-noise ratio is greater than the second signal-to-noise ratio threshold and is less than the first signal-to-noise ratio threshold, performing, by the terminal device, relax measurement by using the previous relax measurement configuration parameter.

A second aspect of the present disclosure provides a terminal device, which may include:

a transceiver module configured to receive system information sent by the network device, the system information including a current relax measurement configuration parameter; and a processing module configured to, under the condition that the current relax measurement configuration parameter is different from a previous relax measurement configuration parameter, enter a parameter update module when current information of the terminal device meets a preset condition, and perform relax measurement by using the current relax measurement configuration parameter when the current information of the terminal device does not meet the preset condition.

Optionally, in some embodiments of the present disclosure, the current information of the terminal device includes:

current remaining power capacity, a current mode, a current state, current signal intensity, current signal quality, or a current signal-to-noise ratio.

Optionally, in some embodiments of the present disclosure, the preset condition met by the current information of the terminal device includes: the current remaining power capacity is lower than or equal to a first power capacity threshold; or, the current mode is a night mode; or, the current state is a static state; or, the current signal intensity is higher than or equal to a first signal intensity threshold; or, the current signal quality is higher than or equal to a first signal quality threshold; or, the current signal-to-noise ratio is greater than or equal to a first signal-to-noise ratio threshold.

Optionally, in some embodiments of the present disclosure,
the processing module is specifically configured to, under the condition that the current relax measurement configuration parameter includes a current search power difference parameter, perform relax measurement by using the previous search power difference parameter when the current search power difference parameter is less than a previous search power difference parameter, and perform relax measurement by using the current search power difference parameter when the current search power difference parameter is greater than or equal to the previous search power difference parameter; or,
the processing module is specifically configured to, under the condition that the current relax measurement configuration parameter includes a current search intensity threshold parameter, perform relax measurement by using the current search intensity threshold parameter when the current search intensity threshold parameter is less than a previous search intensity threshold parameter, and perform relax measurement by using the previous search intensity threshold parameter when the current search intensity threshold parameter is greater than or equal to the previous search intensity threshold parameter; or,
the processing module is specifically configured to, under the condition that the current relax measurement configuration parameter includes a current relax measurement condition parameter, perform relax measurement by using the current relax measurement condition parameter when the current relax measurement condition parameter meets a condition of low mobility or not at cell edge, and perform relax measurement by using a previous relax measurement condition parameter when the current relax measurement condition parameter does not meet the condition of low mobility or not at cell edge; or,
the processing module is specifically configured to, under the condition that the current relax measurement configuration parameter includes a current high priority relax measurement parameter, perform, by the terminal device, relax measurement by using the current high priority relax measurement parameter when the current high priority relax measurement parameter is equal to a preset value, and perform, by the terminal device, relax measurement by using a previous high priority relax measurement parameter when the current high priority relax measurement parameter is not equal to the preset value.

Optionally, in some embodiments of the present disclosure,
the processing module is specifically configured to, under the condition that the current remaining power capacity of the terminal device is higher than or equal to a second power capacity threshold, and the second power capacity threshold is greater than the first power capacity threshold, or, under the condition that the current mode of the terminal device is not the night mode, or, under the condition that the current state of the terminal device is not the static state, perform relax measurement by using the current relax measurement configuration parameter.

Optionally, in some embodiments of the present disclosure,
the processing module is specifically configured to, under the condition that the current signal intensity of the terminal device is lower than or equal to a second signal intensity threshold, and the second signal intensity threshold is less than the first signal intensity threshold, or, under the condition that the current signal quality of the terminal device is lower than or equal to a second signal quality threshold, and the second signal quality threshold is less than the first signal quality threshold, or, under the condition that the current signal-to-noise ratio of the terminal device is less than or equal to a second signal-to-noise ratio threshold, and the second signal-to-noise ratio threshold is less than the first signal-to-noise ratio threshold, perform second parameter update processing.

Optionally, in some embodiments of the present disclosure,
the processing module is specifically configured to, under the condition that the current relax measurement configuration parameter includes the current search power difference parameter, perform relax measurement by using the current search power difference parameter when the current search power difference parameter is less than the previous search power difference parameter, and perform relax measurement by using the previous search power difference parameter when the current search power difference parameter is greater than or equal to the previous search power difference parameter; or,
the processing module is specifically configured to, under the condition that the current relax measurement configuration parameter includes the current search intensity threshold parameter, perform relax measurement by using the previous search intensity threshold parameter when the current search intensity threshold parameter is less than the previous search intensity threshold parameter, and perform relax measurement by using the current search intensity threshold parameter when the current search intensity threshold parameter is greater than or equal to the previous search intensity threshold parameter; or,
the processing module is specifically configured to, under the condition that the current relax measurement configuration parameter includes the current relax measurement condition parameter, perform relax measurement by using the previous relax measurement condition parameter when the current relax measurement condition parameter meets the condition of low mobility or not at cell edge, and perform relax measurement by using the current relax measurement condition parameter when the current relax measurement condition parameter does not meet the condition of low mobility or not at cell edge; or, the processing module is specifically configured to, under the condition that the current relax measurement configuration parameter includes the current high priority relax measurement parameter, perform relax measurement by using the previous high priority relax measurement parameter when the current high priority relax measurement parameter is equal to a preset value, and perform relax measurement by using the current high priority relax measurement parameter when the current high priority relax measurement parameter is not equal to the preset value.

Optionally, in some embodiments of the present disclosure, the processing module is specifically configured to, under the condition that the current remaining power capacity is higher than the first power capacity threshold and is lower than the second power capacity threshold, or, under the condition that the current signal intensity is higher than the second signal intensity threshold and is lower than the first signal intensity threshold, or, under the condition that the current signal quality is higher than the second signal quality threshold and is lower than the first signal quality threshold, or, under the condition that the current signal-to-noise ratio is greater than the second signal-to-noise ratio threshold and is less than the first signal-to-noise ratio threshold, perform relax measurement by using the previous relax measurement configuration parameter.

A third aspect of the present disclosure provides a terminal device, which may include:

a memory having executable program codes stored thereon; and a processor coupled to the memory;

where the processor is configured to call the executable program codes stored in the memory to perform the method as described in the first aspect of the present disclosure and any optional implementation of the first aspect.

A fourth aspect of the embodiment of the present disclosure provides a readable storage medium having a computer program stored thereon, where the computer program, when executed by a processor, causes the processor to perform the method as described in the first aspect of the present disclosure and any optional implementation of the first aspect.

A fifth aspect of the embodiment of the present disclosure discloses a computer program product that, when run on a computer, causes the computer to perform any one of the methods disclosed by the first aspect of the embodiment of the present disclosure.

A sixth aspect of the embodiment of the present disclosure discloses an application publishing platform configured to publish a computer program product that, when run on a computer, causes the computer to perform any one of the methods disclosed by the first aspect of the embodiment of the present disclosure.

It may be seen from the above technical solution that the embodiment of the present disclosure has the following advantages:

In the embodiment of the present disclosure, the terminal device receives the system information sent by the network device, where the system information includes the current relax measurement configuration parameter; under the condition that the current relax measurement configuration parameter is different from a previous relax measurement configuration parameter, when the current information of the terminal device meets the preset condition, the terminal device performs first parameter update processing; and when the current information of the terminal device does not meet the preset condition, the terminal device performs relax measurement by using the previous relax measurement configuration parameter or the current relax measurement configuration parameter, or, the terminal device performs second parameter update processing. When the network device changes the relax measurement configuration parameter in the system information, the terminal device may still independently determine the use of a new relax measurement configuration parameter according to its own conditions, which perfects protocol implementation, allows the terminal device to have more reasonable performance, and improves the intelligent level of the terminal device.

BRIEF DESCRIPTION OF THE DRAWINGS

To more clearly describe the technical solution of the embodiments of the present disclosure, the accompanying drawings that need to be used in the description of the embodiments and the prior art will be briefly introduced below. Apparently, the accompanying drawings in the description below only illustrate some embodiments of the present disclosure. Other accompanying drawings may also be derived from these accompanying drawings.

DETAILED DESCRIPTION OF THE EMBODIMENTS

Figure 1:
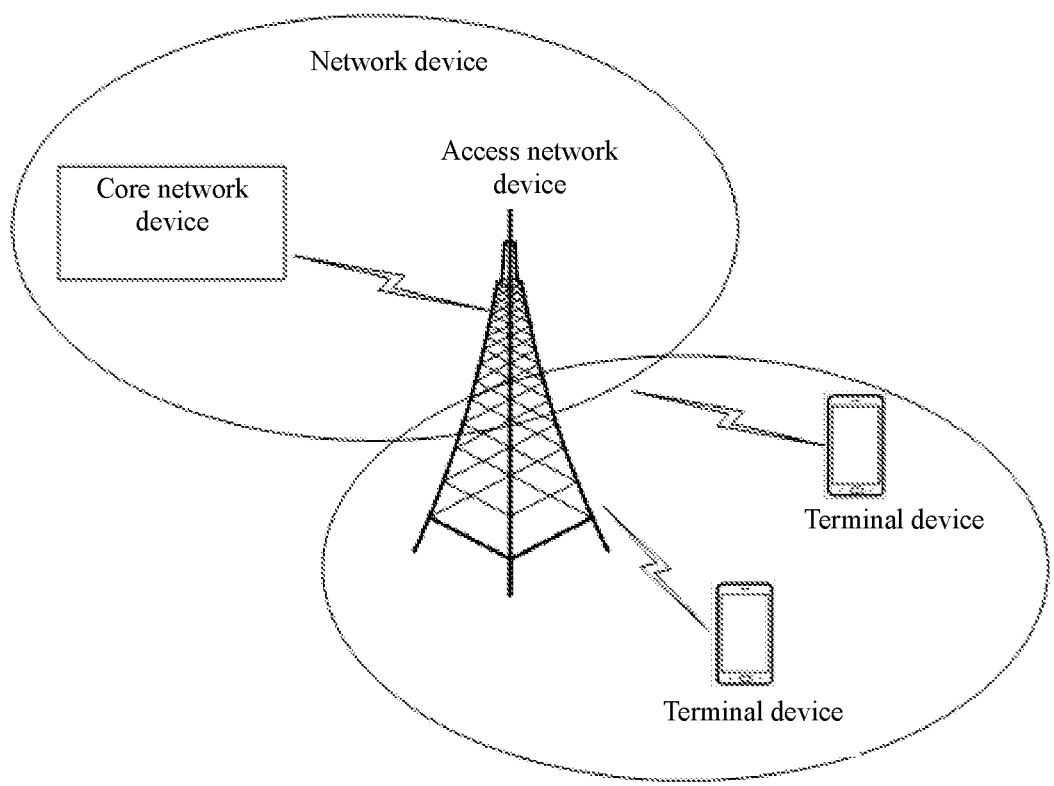
FIG. 1 is an architecture diagram of a communication system applied in an embodiment of the present disclosure.

Provided by embodiments of the present disclosure are a method for processing a relax measurement parameter update, a terminal device, and a computer-readable storage medium. When a network device changes a relax measurement configuration parameter in system information, the terminal device may still independently determine the use of a new relax measurement configuration parameter according to its own conditions, which perfects protocol implementation, allows the terminal device to have more reasonable performance, and improves the intelligent level of the terminal device.

To enable those of skill in the art to better understand the solution of the present disclosure, the technical solution in the embodiments of the present disclosure will be described below in combination with the accompanying drawings in the embodiments of the present disclosure. Apparently, the described embodiments are only part rather than all of the embodiments of the present disclosure. The embodiments in the present disclosure shall fall within the scope of protection of the present disclosure.

For example, a format of a Relaxed Measurement-r16 parameter is shown as follows:

```
relaxedMeasurement-r16   SEQUENCE {
    lowMobilityEvalutation-r16   SEQUENCE {
        s-SearchDeltaP-r16       ENUMERATED {
        dB3, dB6, dB9, dB12, dB15,
        spare3, spare2, spare1}    OPTIONAL,     -- Need S
        t-SearchDeltaP-r16         ENUMERATED {
        s5, s10, s20, s30, s60, s120, s180,
        s240, s300, spare7, spare6, spare5,
        spare4, spare3, spare2, spare1}   OPTIONAL    -- NeedS
    }                                               OPTIONAL,    --
Cond OptMandatory
    cellEdgeEvalutation-r16          SEQUENCE {
        s-SearchThresholdP-r16                     ReselectionThreshold
OPTIONAL,     -- Need R
        s-SearchThresholdQ-r16                     ReselectionThresholdQ
OPTIONAL      -- Need R
    }                                               OPTIONAL,    --
Cond OptMandatory
    relaxedMeasCondition-r16         ENUMERATED {
                                 lowMobilityOrNotAtCellEdge,
                                 lowMobilityAndNotAtCellEdge}
OPTIONAL,     -- Cond MultRelaxCriteria
    highPriorityMeasRelax-r16                  ENUMERATED {true}
OPTIONAL      -- Need R
    }                                               OPTIONAL    --
Need R
}
``` where the relaxed Measurement-r16 parameter in the above protocol content may include the following parameters:

(1) A Low Mobility Evaluation-r16 Parameter where low Mobility Evaluation-r16 includes a cell selection reception level-search power difference parameter (Srxlev-search delta power-r16, s-Search Delta P-r16), and/or a time-search power difference parameter (time-search delta power-r16, t-Search Delta P-r16).

(2) A Cell Edge Evaluation-r16 Parameter where cell Edge Evaluation-r16 includes a cell selection reception level-search power threshold (Srxlev-search threshold power-r16, s-Search Threshold P-r16), and/or a cell selection reception level-search quality threshold (Srxlev-Search Threshold Quality-r16, s-Search Threshold Q-r16).

(3) A Relaxed Meas Condition-r16 where the relaxed Meas Condition-r16 includes: low Mobility Or Not At Cell Edge, or, low Mobility And Not At Cell Edge.

(4) A High Priority Meas Relax-r16 Parameter where a value of high Priority Meas Relax-r16 may be true or false.

As shown in FIG. 1, it is an architecture diagram of a communication system applied in an embodiment of the present disclosure. The communication system may include a network device and a terminal device. The network device may further include an access network device and a core network device. The radio communication system further includes a plurality of core networks configured for communication with the access network device. The access network device may be an evolutional node B (eNB or e-NodeB for short) that is a macro node B, a micro node B (also referred to as "small node B"), a micro-micro node B, an access point (AP), a transmission point (TP), or a new generation node B (gNodeB) in a long-term evolution (LTE) system, a new radio (NR) system, or an authorized auxiliary access long-term evolution (LAA-LTE) system.

The terminal device may be referred to as user equipment (UE), a mobile station (MS), a mobile terminal, an intelligent terminal, etc. The terminal device may communicate with one or more core networks via a radio access network (RAN). For example, the terminal device may be a mobile phone (or referred to as a "cellular" phone), a computer with the mobile terminal, etc. The terminal device may also be a portable, pocket, handheld, computer built-in or vehicle-mounted mobile device and a terminal device in a future NR network, that exchange voice and data with the radio access network. According to the description of the terminal device, in the present disclosure, the terminal device may also include a Relay, and those that may perform data communication with the node B may be regarded as terminal devices.

Figure 2:
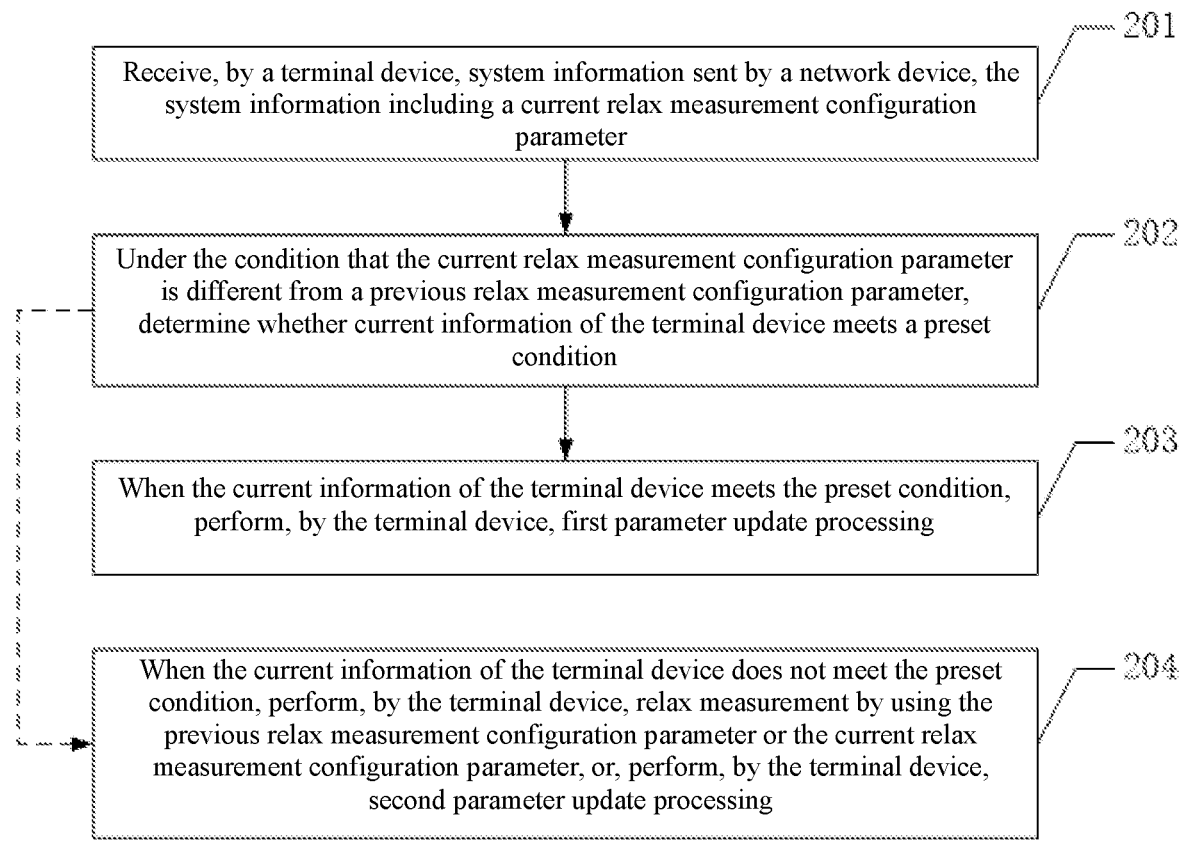
FIG. 2 is one embodiment schematic diagram of a method for processing a relax measurement parameter update in an embodiment of the present disclosure.

The technical solution of the present disclosure is further described by the embodiment below. As shown in FIG. 2, it is one embodiment schematic diagram of a method for processing a relax measurement parameter update in an embodiment of the present disclosure. The method may include:

201: receiving, by a terminal device, system information sent by a network device, the system information including a current relax measurement configuration parameter.

For example, after the terminal device is powered on, it receives the system information sent by the network device, saves content in a system information block2 (SIB2), saves an identity (ID) of a serving cell, and registers a network normally.

The system information may be the SIB2, and the current relax measurement configuration parameter may be the current relaxed Measurement-r16 parameter. When the terminal device receives a new SIB2, it detects whether the current relaxed Measurement-r16 parameter in the new SIB2 changes. If there is no change, it proceeds to a normal system information update process; and if the current relaxed Measurement-r16 parameter changes, step 202 is performed.

The current relax measurement configuration parameter may include at least one of a current low mobility evaluation parameter, a current cell edge evaluation parameter, a current relax measurement condition parameter, and a current high priority relax measurement parameter. The current low mobility evaluation parameter may also be referred to as a current search power difference parameter; and the current cell edge evaluation parameter may also be referred to as a current search intensity threshold parameter.

202: under the condition that the current relax measurement configuration parameter is different from a previous relax measurement configuration parameter, determining whether current information of the terminal device meets a preset condition.

The current information of the terminal device includes but not limited to the following information:

current remaining power capacity, a current mode, a current state, current signal intensity, current signal quality, or a current signal-to-noise ratio.

203: when the current information of the terminal device meets the preset condition, performing, by the terminal device, first parameter update processing.

The preset condition met by the current information of the terminal device may include but not limited to the following conditions:

(1) the current remaining power capacity is lower than or equal to a first power capacity threshold. For example, it is determined whether the current remaining power capacity is lower than or equal to N %, and when it is lower than or equal to N %, the first parameter update processing is performed. N is a preset value of the terminal device and may be set to be an empirical value.

Or, (2) the current mode is a night mode. For example, the terminal device is in the night mode (for example, from 11:00 p.m. to 5:00 a.m., it may be considered to be in the night mode, or the time may be adjusted to other time periods and is not specifically limited here).

Or, (3) the current state is a static state. For example, when the terminal device is in the static state (for example, it is always in the static state after being resided in the current serving cell, or other determination methods may also be used for determining whether it is in the static or motion state), it performs the first parameter update processing.

Or, (4) the current signal intensity is higher than or equal to a first signal intensity threshold. For example, when the current signal intensity of the terminal device is higher than or equal to −90 dbm, the first parameter update processing is performed. −90 dbm in the example is an empirical value, and the technical solution of the present disclosure may also include the signal intensity set to be other values, which is not specifically limited here.

Or, (5) the current signal quality is higher than or equal to a first signal quality threshold.

Or, (6) the current signal-to-noise ratio is greater than or equal to a first signal-to-noise ratio threshold.

Figure 3:
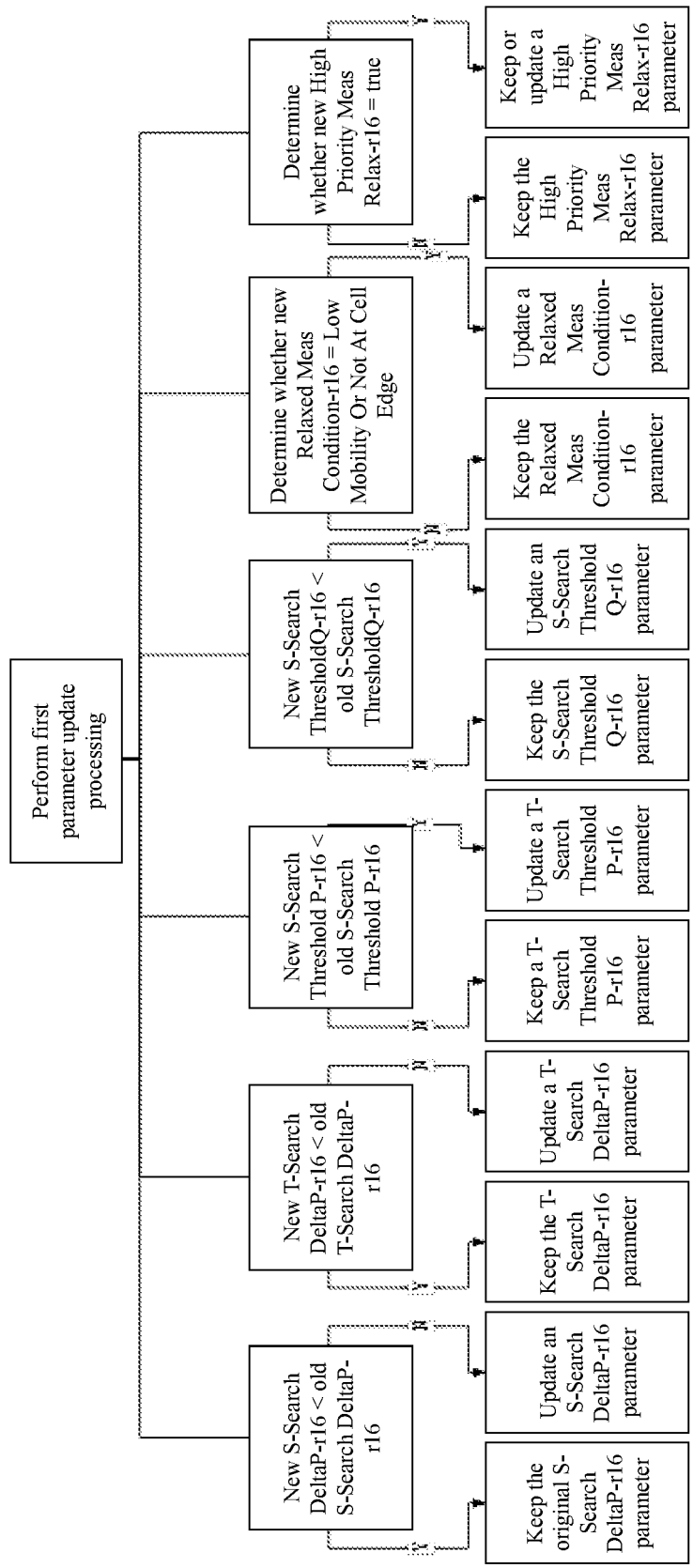
FIG. 3 is one schematic diagram of performing first parameter update processing by a terminal device in an embodiment of the present disclosure.

The performing, by the terminal device, first parameter update processing may include but not limited to the implementations below. As shown in FIG. 3, it is one schematic diagram of performing first parameter update processing by a terminal device in an embodiment of the present disclosure.

(1) Under the condition that the current relax measurement configuration parameter includes a current search power difference parameter, when the current search power difference parameter is less than a previous search power difference parameter, performing, by the terminal device, relax measurement by using the previous search power difference parameter, and when the current search power difference parameter is greater than or equal to the previous search power difference parameter, performing, by the terminal device, relax measurement by using the current search power difference parameter.

Optionally, the current search power difference parameter may be a current Search Delta Power-r16 parameter. The current Search Delta Power-r16 parameter may include a current s-Search Delta P-r16 (Srxlev-Search Delta Power-r16) parameter, which may also be referred to as a new s-Search Delta P-r16 parameter, or, a current t-Search Delta P-r16 (Time-Search Delta Power-r16) parameter, which may also be referred to as a new t-Search Delta P-r16 parameter.

For example, when the new s-Search Delta P-r16 parameter is less than a previously saved s-Search Delta P-r16 parameter, the s-Search Delta P-r16 parameter is kept unchanged, that is to say, relax measurement is performed by using the previously saved s-Search Delta P-r16 parameter; otherwise, relax measurement is performed by using the new s-Search Delta P-r16 parameter.

When the new t-Search Delta P-r16 parameter is less than a previously saved t-Search Delta P-r16 parameter, the t-Search Delta P-r16 parameter is kept unchanged, that is to say, relax measurement is performed by using the previously saved t-Search Delta P-r16 parameter; otherwise, relax measurement is performed by using the new t-Search Delta P-r16 parameter.

Or, (2) under the condition that the current relax measurement configuration parameter includes a current search intensity threshold parameter, when the current search intensity threshold parameter is less than a previous search intensity threshold parameter, performing, by the terminal device, relax measurement by using the current search intensity threshold parameter, and when the current search intensity threshold parameter is greater than or equal to the previous search intensity threshold parameter, performing, by the terminal device, relax measurement by using the previous search intensity threshold parameter.

Optionally, the current search intensity threshold parameter may be a current s-Search Threshold-r16 (srxlev-Search Threshold-r16) parameter. The current s-Search Threshold-r16 parameter may include a current s-Search Threshold P-r16 (Srxlev-Search Threshold Power-r16) parameter, which may also be referred to as a new s-Search Threshold P-r16 parameter, or a current s-Search Threshold Q-r16 (Srxlev-Search Threshold Quality-r16) parameter, which may also be referred to as a new s-Search Threshold Q-r16 parameter.

For example, when the new s-Search Threshold P-r16 parameter is less than a previously saved s-Search Threshold P-r16 parameter, relax measurement is performed by using the new s-Search Threshold P-r16 parameter; otherwise, the s-Search Threshold P-r16 parameter is kept unchanged, that is to say, relax measurement is performed by using the previously saved s-Search Threshold P-r16 parameter.

When the new s-Search Threshold Q-r16 parameter is less than a previously saved s-Search Threshold Q-r16 parameter, relax measurement is performed by using the new s-Search Threshold Q-r16 parameter; otherwise, the s-Search Threshold Q-r16 parameter is kept unchanged, that is to say, relax measurement is performed by using the previously saved s-Search Threshold Q-r16 parameter.

Or, (3) under the condition that the current relax measurement configuration parameter includes a current relax measurement condition parameter, when the current relax measurement condition parameter meets a condition of low Mobility or Not At Cell Edge, performing, by the terminal device, relax measurement by using the current relax measurement condition parameter, and when the current relax measurement condition parameter does not meet the condition of low mobility or not at cell edge, performing, by the terminal device, relax measurement by using a previous relax measurement condition parameter.

Optionally, the current relax measurement condition parameter may be a current relaxed Meas Condition-r16 (relaxed Measurement Condition-r16) parameter, which may also be referred to as a new relaxed Meas Condition-r16 parameter.

For example, when the new relaxed Meas Condition-r16 parameter meets the condition of low Mobility Or Not At Cell Edge, relax measurement is performed by using the new relaxed Meas Condition-r16 parameter, otherwise, the relaxed Meas Condition-r16 parameter is kept unchanged, that is to say, relax measurement is performed by using a previously saved relaxed Meas Condition-r16 parameter.

Or, (4) under the condition that the current relax measurement configuration parameter includes a current high priority relax measurement parameter, when the current high priority relax measurement parameter is equal to a preset value, performing, by the terminal device, relax measurement by using the current high priority relax measurement parameter, and when the current high priority relax measurement parameter is not equal to the preset value, performing, by the terminal device, relax measurement by using a previous high priority relax measurement parameter.

Optionally, the current high priority relax measurement parameter may be a current high Priority Meas Relax-r16 (high Priority Measurement Relax-r16) parameter, which may also be referred to as a new high Priority Meas Relax-r16 parameter.

For example, when the new high Priority Meas Relax-r16 parameter is equal to TRUE, relax measurement is performed by using the new high Priority Meas Relax-r16 parameter, otherwise, the high Priority Meas Relax-r16 parameter is kept unchanged, that is to say, relax measurement is performed by using a previously saved high Priority Meas Relax-r16 parameter.

204: when the current information of the terminal device does not meet the preset condition, performing, by the terminal device, relax measurement by using the previous relax measurement configuration parameter or the current relax measurement configuration parameter, or, performing, by the terminal device, second parameter update processing.

The when the current information of the terminal device does not meet the preset condition, performing, by the terminal device, relax measurement by using the previous relax measurement configuration parameter or the current relax measurement configuration parameter may include but not limited to the following implementations:

(1) Under the condition that the current remaining power capacity of the terminal device is higher than or equal to a second power capacity threshold, and the second power capacity threshold is greater than the first power capacity threshold, or, under the condition that the current mode of the terminal device is not the night mode, or, under the condition that the current state of the terminal device is not the static state, performing, by the terminal device, relax measurement by using the current relax measurement configuration parameter.

For example, when the current remaining power capacity is higher than or equal to M %, the new relaxed Measurement-r16 parameter is used, where M is a preset value of the terminal device and may be set to be an empirical value, and N is less than or equal to M. Or, when the terminal device is not in the night mode, the new relaxed Measurement-r16 parameter is used. Or, when the terminal device is not in the static state, the new relaxed Measurement-r16 parameter is used.

(2) Under the condition that the current signal intensity of the terminal device is lower than or equal to a second signal intensity threshold, and the second signal intensity threshold is less than the first signal intensity threshold, or, under the condition that the current signal quality of the terminal device is lower than or equal to a second signal quality threshold, and the second signal quality threshold is less than the first signal quality threshold, or, under the condition that the current signal-to-noise ratio of the terminal device is less than or equal to a second signal-to-noise ratio threshold, and the second signal-to-noise ratio threshold is less than the first signal-to-noise ratio threshold, performing, by the terminal device, second parameter update processing.

For example, when the current signal intensity of the terminal device is lower than or equal to −120 dbm, the second parameter update processing is performed. −120 dbm in the example is an empirical value, and the technical solution of the present disclosure may also include the signal intensity set to be other values, which is not specifically limited here.

Figure 4:
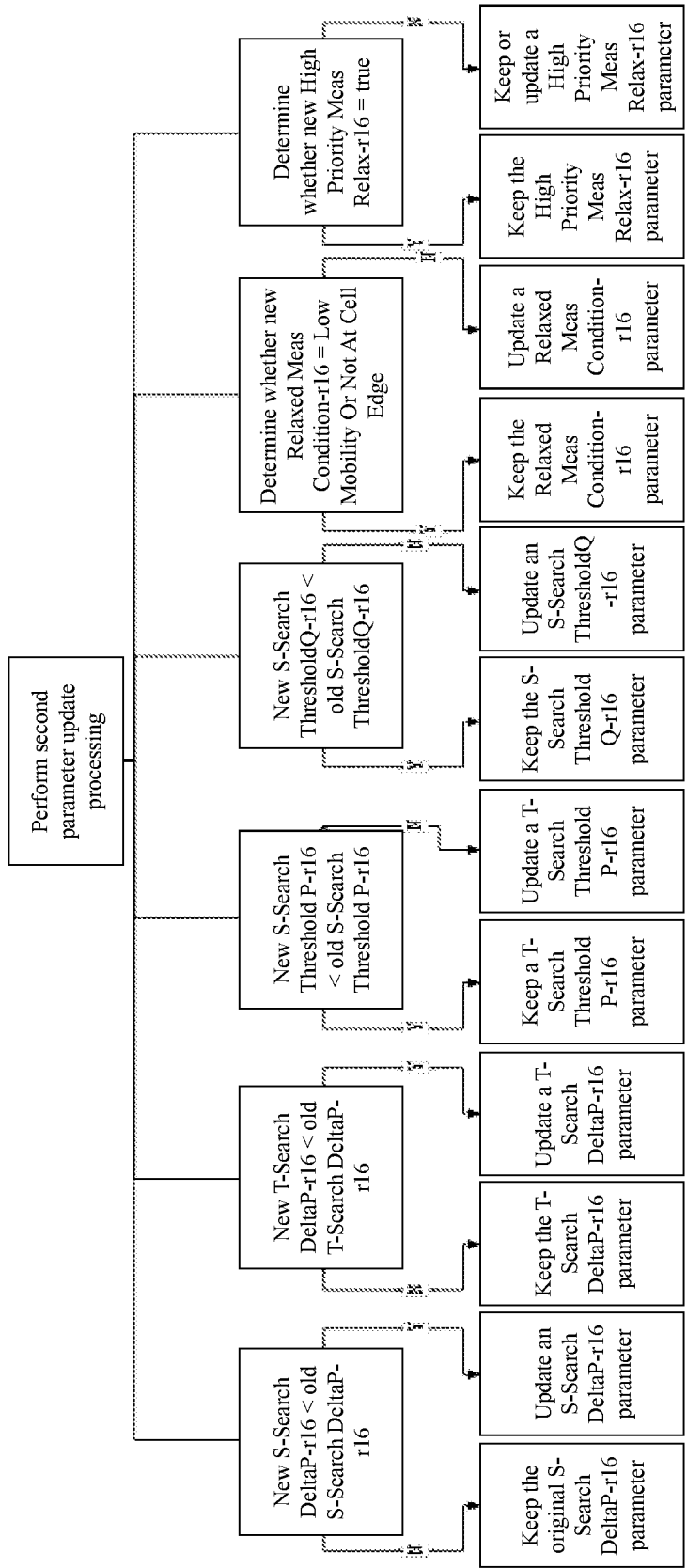
FIG. 4 is one schematic diagram of performing second parameter update processing by a terminal device in an embodiment of the present disclosure.

Optionally, the performing, by the terminal device, second parameter update processing may include but not limited to the implementations below. As shown in FIG. 4, it is one schematic diagram of performing second parameter update processing by a terminal device in an embodiment of the present disclosure.

One: under the condition that the current relax measurement configuration parameter includes the current search power difference parameter, when the current search power difference parameter is less than the previous search power difference parameter, performing, by the terminal device, relax measurement by using the current search power difference parameter, and when the current search power difference parameter is greater than or equal to the previous search power difference parameter, performing, by the terminal device, relax measurement by using the previous search power difference parameter.

For example, when the new s-Search Delta P-r16 parameter is less than the previously saved s-Search Delta P-r16 parameter, relax measurement is performed by using the new s-Search Delta P-r16 parameter, otherwise, the s-Search Delta P-r16 parameter is kept unchanged, that is to say, relax measurement is performed by using the previously saved s-Search Delta P-r16 parameter.

When the new t-Search Delta P-r16 parameter is less than the previously saved t-Search Delta P-r16 parameter, relax measurement is performed by using the new t-Search Delta P-r16 parameter, otherwise, the t-Search Delta P-r16 parameter is kept unchanged, that is to say, relax measurement is performed by using the previously saved t-Search Delta P-r16 parameter.

Or, two: under the condition that the current relax measurement configuration parameter includes the current search intensity threshold parameter, when the current search intensity threshold parameter is less than the previous search intensity threshold parameter, performing, by the terminal device, relax measurement by using the previous search intensity threshold parameter, and when the current search intensity threshold parameter is greater than or equal to the previous search intensity threshold parameter, performing, by the terminal device, relax measurement by using the current search intensity threshold parameter.

For example, when the new s-Search Threshold P-r16 parameter is less than the previously saved s-Search Threshold P-r16 parameter, the s-Search Threshold P-r16 parameter is kept unchanged, that is to say, relax measurement is performed by using the previously saved s-Search Threshold P-r16 parameter, otherwise, relax measurement is performed by using the new s-Search Threshold P-r16 parameter.

When the new s-Search Threshold Q-r16 parameter is less than the previously saved s-Search Threshold Q-r16 parameter, the s-Search Threshold Q-r16 parameter is kept unchanged, that is to say, relax measurement is performed by using the previously saved s-Search Threshold Q-r16 parameter, otherwise, relax measurement is performed by using the new s-Search Threshold Q-r16 parameter.

Or, three: under the condition that the current relax measurement configuration parameter includes the current relax measurement condition parameter, when the current relax measurement condition parameter meets the condition of low mobility or not at cell edge, performing, by the terminal device, relax measurement by using the previous relax measurement condition parameter, and when the current relax measurement condition parameter does not meet the condition of low mobility or not at cell edge, performing, by the terminal device, relax measurement by using the current relax measurement condition parameter.

For example, when the new relaxed Meas Condition-r16 parameter meets the condition of low Mobility and Not At Cell Edge, the relaxed Meas Condition-r16 parameter is kept unchanged, that is to say, relax measurement is performed by using the previously saved relaxed Meas Condition-r16 parameter, otherwise, relax measurement is performed by using the new relaxed Meas Condition-r16 parameter.

Or, four: under the condition that the current relax measurement configuration parameter includes the current high priority relax measurement parameter, when the current high priority relax measurement parameter is equal to a preset value, performing, by the terminal device, relax measurement by using the previous high priority relax measurement parameter, and when the current high priority relax measurement parameter is not equal to the preset value, performing, by the terminal device, relax measurement by using the current high priority relax measurement parameter.

For example, a default value is TRUE. When the new high Priority Meas Relax-r16 parameter is equal to TRUE, the high Priority Meas Relax-r16 parameter is kept unchanged, that is to say, relax measurement is performed by using the previously saved high Priority Meas Relax-r16 parameter, otherwise, relax measurement is performed by using the new high Priority Meas Relax-r16 parameter.

(3) Under the condition that the current remaining power capacity is higher than the first power capacity threshold and is lower than the second power capacity threshold, or, under the condition that the current signal intensity is higher than the second signal intensity threshold and is lower than the first signal intensity threshold, or, under the condition that the current signal quality is higher than the second signal quality threshold and is lower than the first signal quality threshold, or, under the condition that the current signal-to-noise ratio is greater than the second signal-to-noise ratio threshold and is less than the first signal-to-noise ratio threshold, performing, by the terminal device, relax measurement by using the previous relax measurement configuration parameter.

For example, when the current remaining power capacity ranges from N % to M %, the relaxed Measurement-r16 parameter is kept unchanged (M and N are the preset values of the terminal device and may be set to be the empirical values, and N is less than or equal to M).

For example, when the current signal intensity of the terminal device ranges from −90 dbm to −120 dbm, the relaxed Measurement-r16 parameter is kept unchanged, where −90 dbm and −120 dbm in the example are the empirical values, and the technical solution of the present disclosure may also include the signal intensity set to be other values, which is not specifically limited here.

In the embodiment of the present disclosure, the terminal device receives the system information sent by the network device, where the system information includes the current relax measurement configuration parameter; under the condition that the current relax measurement configuration parameter is different from a previous relax measurement configuration parameter, when the current information of the terminal device meets the preset condition, the terminal device performs first parameter update processing; and when the current information of the terminal device does not meet the preset condition, the terminal device performs relax measurement by using the previous relax measurement configuration parameter or the current relax measurement configuration parameter, or, the terminal device performs second parameter update processing. When the network device changes the relax measurement configuration parameter in the system information, the terminal device may still independently determine the use of a new relax measurement configuration parameter according to its own conditions, which perfects protocol implementation, allows the terminal device to have more reasonable performance, and improves the intelligent level of the terminal device.

Further, in specific scenarios (such as low power, the static state, a strong signal region, and the night mode), the conditions for performing the relax measurement are relaxed to reduce power consumption; in some specific scenarios (such as a weak signal region), the conditions for performing the relax measurement are stricter to ensure the reliability of services; and under other conditions, the original relax measurement parameter may be kept, or the relax measurement parameter newly issued by the network may be updated, which perfects protocol implementation, allows the terminal to have more reasonable performance, and improves the intelligent level of the terminal.

Figure 5:
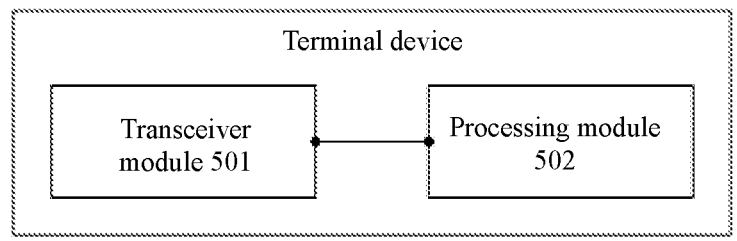
FIG. 5 is one embodiment schematic diagram of a terminal device in an embodiment of the present disclosure.

As shown in FIG. 5, it is one embodiment schematic diagram of a terminal device in an embodiment of the present disclosure. The terminal device may include:
  a transceiver module 501 configured to receive system information sent by a network device, the system information including a current relax measurement configuration parameter; and
  a processing module 502 configured to, under the condition that the current relax measurement configuration parameter is different from a previous relax measurement configuration parameter, enter a parameter update module when current information of the terminal device meets a preset condition, and perform relax measurement by using the current relax measurement configuration parameter when the current information of the terminal device does not meet the preset condition.

Optionally, in some embodiments of the present disclosure, the current information of the terminal device includes: current remaining power capacity, a current mode, a current state, current signal intensity, current signal quality, or a current signal-to-noise ratio.

Optionally, in some embodiments of the present disclosure, the preset condition met by the current information of the terminal device includes: the current remaining power capacity is lower than or equal to a first power capacity threshold; or, the current mode is a night mode; or, the current state is a static state; or, the current signal intensity is higher than or equal to a first signal intensity threshold; or, the current signal quality is higher than or equal to a first signal quality threshold; or, the current signal-to-noise ratio is greater than or equal to a first signal-to-noise ratio threshold.

Optionally, in some embodiments of the present disclosure, the processing module 502 is specifically configured to, under the condition that the current relax measurement configuration parameter includes a current search power difference parameter, perform relax measurement by using the previous search power difference parameter when the current search power difference parameter is less than a previous search power difference parameter, and perform relax measurement by using the current search power difference parameter when the current search power difference parameter is greater than or equal to the previous search power difference parameter; or, the processing module 502 is specifically configured to, under the condition that the current relax measurement configuration parameter includes a current search intensity threshold parameter, perform relax measurement by using the current search intensity threshold parameter when the current search intensity threshold parameter is less than a previous search intensity threshold parameter, and perform relax measurement by using the previous search intensity threshold parameter when the current search intensity threshold parameter is greater than or equal to the previous search intensity threshold parameter; or, the processing module 502 is specifically configured to, under the condition that the current relax measurement configuration parameter includes a current relax measurement condition parameter, perform relax measurement by using the current relax measurement condition parameter when the current relax measurement condition parameter meets a condition of low mobility or not at cell edge, and perform relax measurement by using a previous relax measurement condition parameter when the current relax measurement condition parameter does not meet the condition of low mobility or not at cell edge; or, the processing module 502 is specifically configured to, under the condition that the current relax measurement configuration parameter includes a current high priority relax measurement parameter, perform, by the terminal device, relax measurement by using the current high priority relax measurement parameter when the current high priority relax measurement parameter is equal to a preset value, and perform, by the terminal device, relax measurement by using a previous high priority relax measurement parameter when the current high priority relax measurement parameter is not equal to the preset value.

Optionally, in some embodiments of the present disclosure, the processing module 502 is specifically configured to, under the condition that the current remaining power capacity of the terminal device is higher than or equal to a second power capacity threshold, and the second power capacity threshold is greater than the first power capacity threshold, or, under the condition that the current mode of the terminal device is not the night mode, or, under the condition that the current state of the terminal device is not the static state, perform relax measurement by using the current relax measurement configuration parameter.

Optionally, in some embodiments of the present disclosure, the processing module 502 is specifically configured to, under the condition that the current signal intensity of the terminal device is lower than or equal to a second signal intensity threshold, and the second signal intensity threshold is less than the first signal intensity threshold, or, under the condition that the current signal quality of the terminal device is lower than or equal to a second signal quality threshold, and the second signal quality threshold is less than the first signal quality threshold, or, under the condition that the current signal-to-noise ratio of the terminal device is less than or equal to a second signal-to-noise ratio threshold, and the second signal-to-noise ratio threshold is less than the first signal-to-noise ratio threshold, perform second parameter update processing.

Optionally, in some embodiments of the present disclosure, the processing module 502 is specifically configured to, under the condition that the current relax measurement configuration parameter includes the current search power difference parameter, perform relax measurement by using the current search power difference parameter when the current search power difference parameter is less than the previous search power difference parameter, and perform relax measurement by using the previous search power difference parameter when the current search power difference parameter is greater than or equal to the previous search power difference parameter; or, the processing module 502 is specifically configured to, under the condition that the current relax measurement configuration parameter includes the current search intensity threshold parameter, perform relax measurement by using the previous search intensity threshold parameter when the current search intensity threshold parameter is less than the previous search intensity threshold parameter, and perform relax measurement by using the current search intensity threshold parameter when the current search intensity threshold parameter is greater than or equal to the previous search intensity threshold parameter; or, the processing module 502 is specifically configured to, under the condition that the current relax measurement configuration parameter includes the current relax measurement condition parameter, perform relax measurement by using the previous relax measurement condition parameter when the current relax measurement condition parameter meets the condition of low mobility or not at cell edge, and perform relax measurement by using the current relax measurement condition parameter when the current relax measurement condition parameter does not meet the condition of low mobility or not at cell edge; or, the processing module 502 is specifically configured to, under the condition that the current relax measurement configuration parameter includes the current high priority relax measurement parameter, perform relax measurement by using the previous high priority relax measurement parameter when the current high priority relax measurement parameter is equal to a preset value, and perform relax measurement by using the current high priority relax measurement parameter when the current high priority relax measurement parameter is not equal to the preset value.

Optionally, in some embodiments of the present disclosure, the processing module 502 is specifically configured to, under the condition that the current remaining power capacity is higher than the first power capacity threshold and is lower than the second power capacity threshold, or, under the condition that the current signal intensity is higher than the second signal intensity threshold and is lower than the first signal intensity threshold, or, under the condition that the current signal quality is higher than the second signal quality threshold and is lower than the first signal quality threshold, or, under the condition that the current signal-to-noise ratio is greater than the second signal-to-noise ratio threshold and is less than the first signal-to-noise ratio threshold, perform relax measurement by using the previous relax measurement configuration parameter.

Figure 6:
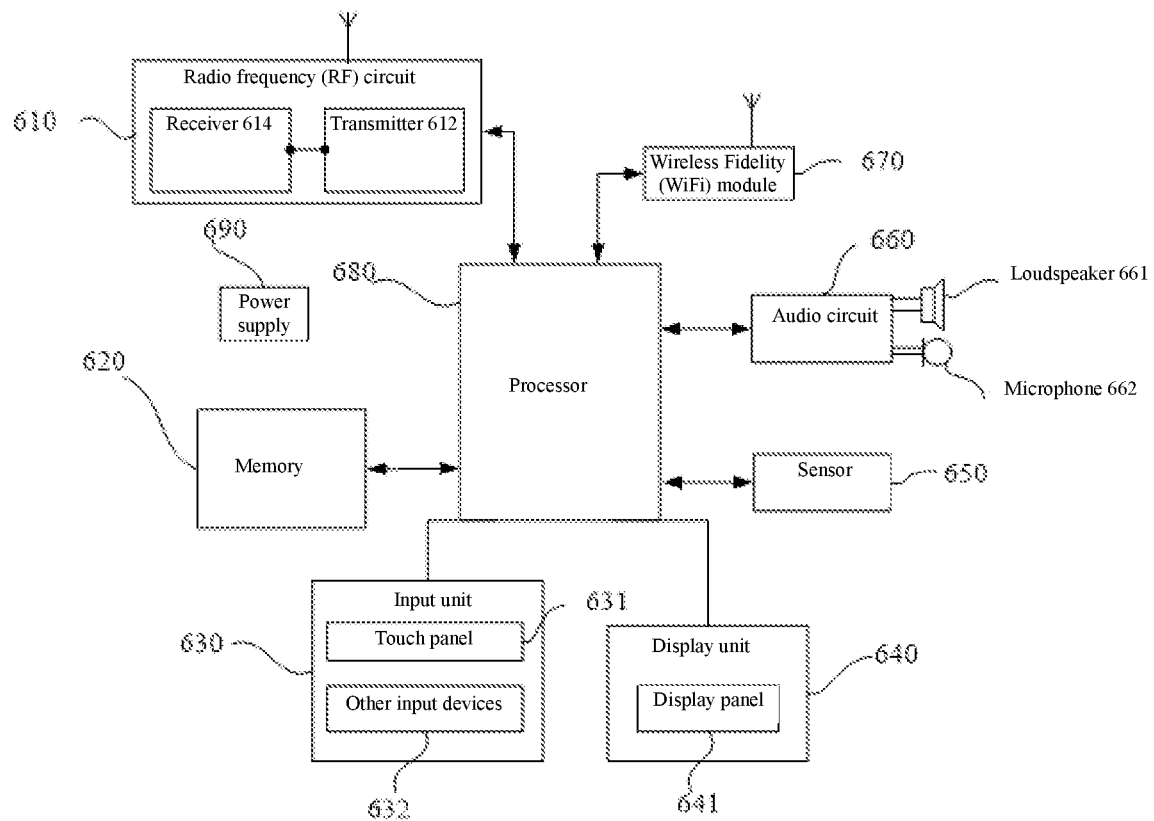
FIG. 6 is another embodiment schematic diagram of a terminal device in an embodiment of the present disclosure.

As shown in FIG. 6, it is another embodiment schematic diagram of a terminal device in an embodiment of the present disclosure. The terminal device is described by taking the mobile phone as an example, and may include: a radio frequency (RF) circuit 610, a memory 620, an input unit 630, a display unit 640, a sensor 650, an audio circuit 660, a wireless fidelity (WiFi) module 670, a processor 680, a power supply 690, and other components. The radio frequency circuit 610 includes a receiver 614 and a transmitter 612. Those skilled in the art may understand that the structure of the mobile phone shown in FIG. 6 does not constitute a limitation to the mobile phone, and may include more or fewer components than shown in the figure, or combination of some components, or different component arrangements.

The components of the mobile phone are specifically introduced below with reference to FIG. 6:

The RF circuit 610 may be configured to receive and send a signal during information receiving and transmitting or conversation. In particular, downlink information of the node B is received and sent to the processor 680 for processing. In addition, design uplink data is sent to the node B. In general, the RF circuit 610 includes but is not limited to an antenna, at least one amplifier, a transceiver, a coupler, a low noise amplifier (LNA), a duplexer, etc. In addition, the RF circuit 610 may also communicate with the network and other devices via radio communication. The above radio communication may use any communication standard or protocol, including but not limited to a global system of mobile communication (GSM), a general packet radio service (GPRS), code division multiple access (CDMA), wideband code division multiple access (WCDMA), long term evolution (LTE), an e-mail, a short messaging service (SMS), etc.

The memory 620 may be configured to store software programs and modules. The processor 680 may execute various functional applications and data processing of the mobile phone by running the software programs and the modules stored in the memory 620. The memory 620 may mainly include a program storage region and a data storage region, where the program storage region may store an operating system, an application program required for at least one function (such as a sound play function and an image play function), etc.; and the data storage region may store data (such as audio data and a phone book), etc. created according to the use of the mobile phone. In addition, the memory 620 may include a high speed random access memory, and may also include a non-volatile memory, such as at least one disk memory, a flash memory, or other volatile solid-state memories.

The input unit 630 may be configured to receive input digital or character information and to generate key signal inputs related to user settings and function control of the mobile phone. Specifically, the input unit 630 may include a touch panel 631 and other input devices 632. The touch panel 631, also referred to as a touch screen, may collect user's touch operation (such as user's operation on or near the touch panel 631 with any suitable object or accessory such as a finger and a touch pen) on or near the touch panel, and drive a corresponding connection device according to a preset program. Optionally, the touch panel 631 may include two parts of a touch detection device and a touch controller. The touch detection device detects a touch orientation of a user, detects a signal generated by touch operation, and transmits the signal to the touch controller; and the touch controller receives touch information from the touch detection device, converts the touch information into touch point coordinates, then sends the touch point coordinates to the processor 680, and can receive commands transmitted from the processor 680 and execute the commands. In addition, the touch panel 631 may be realized by means of various types such as resistors, capacitors, infrared rays, and surface acoustic waves. In addition to the touch panel 631, the input unit 630 may also include other input devices 632. Specifically, other input devices 632 may include, but are not limited to, one or more of a physical keyboard, function keys (such as a volume control key and a switch key), a trackball, a mouse, a joystick, etc.

The display unit 640 may be configured to display information input by the user or information provided to the user and various menus of the mobile phone. The display unit 640 may include a display panel 641. Optionally, the display panel 641 may be configured in the form of a liquid crystal display (LCD), an organic light-emitting diode (OLED), etc. Further, the touch panel 631 may cover the display panel 641. When the touch panel 631 detects the touch operation on or near the touch panel, the touch operation is transmitted to the processor 680 to determine the type of a touch event, and then the processor 680 provides a corresponding visual output on the display panel 641 according to the type of the touch event. Although in FIG. 6, the touch panel 631 and the display panel 641 serve as two independent components to realize input and output functions of the mobile phone, but in some embodiments, the touch panel 631 may be integrated with the display panel 641 to realize the input and output functions of the mobile phone.

The mobile phone may also include at least one sensor 650, such as a light sensor, a motion sensor, and other sensors. Specifically, the light sensor may include an ambient light sensor and a proximity sensor, where the ambient light sensor may adjust the brightness of the display panel 641 according to the brightness of ambient light, and the proximity sensor may turn off the display panel 641 and/or backlight when the mobile phone moves to the ear. As one of motion sensors, an accelerometer sensor may detect the magnitudes of accelerations in all directions (generally three axes), may detect the magnitude and direction of gravity when stationary, and may be configured to recognize mobile phone attitude applications (such as horizontal and vertical screen switching, related games, and magnetometer attitude calibration), vibration recognition related functions (such as a pedometer and tapping), etc.; and as for a gyroscope, a barometer, a hygrometer, a thermometer, an infrared sensor, and other sensors that may also be configured on the mobile phone, they will not be repeated here.

The audio circuit 660, a loudspeaker 661, and a microphone 662 may provide an audio interface between the user and the mobile phone. The audio circuit 660 may transmit an electrical signal obtained by converting received audio data to the loudspeaker 661, and the loudspeaker 661 converts the electrical signal into a sound signal and outputs the sound signal. In another aspect, the microphone 662 converts the collected sound signal into the electrical signal, the audio circuit 660 receives the electrical signal and then converts the electrical signal into the audio data, the audio data is output to the processor 680 for processing, the processed audio data is sent to another mobile phone via the RF circuit 610, or the processed audio data is output to the memory 620 for further processing.

WiFi belongs to a short-range wireless transmission technology. The mobile phone may help the user to receive and send e-mails, browse web pages, and access streaming media via the WiFi module 670. It provides the user with wireless wideband Internet access. Although FIG. 6 shows the WiFi module 670, it may be understood that the WiFi module does not belong to the necessary component of the mobile phone and completely may be omitted as needed within the scope of not changing the essence of the disclosure.

The processor 680 is a control center of the mobile phone. It connects various parts of the entire mobile phone by means of various interfaces and circuits. It executes various functions and processing data of the mobile phone by running or executing the software programs and/or the modules stored in the memory 620 and calling the data stored in the memory 620, to monitor the entire mobile phone. Optionally, the processor 680 may include one or more processing units. Preferably, the processor 680 may integrate an application processor and a modem processor, where the application processor mainly processes the operating system, user interfaces, and application programs, and the modem processor mainly processes radio communication. It may be understood that the above modem processor may also not be integrated into the processor 680.

The mobile phone further includes the power supply 690 (such as a battery) that supplies power to various components. Preferably, the power supply may be logically connected to the processor 680 via a power management system, such that the functions such as charging, discharging, and power consumption can be managed via the power management system. Although not shown, the mobile phone may further include a camera, a Bluetooth module, etc., which will not be repeated here.

In the embodiment of the present disclosure, the RF circuit 610 is configured to receive system information sent by a network device, where the system information includes a current relax measurement configuration parameter; and
the processor 680 is configured to, under the condition that the current relax measurement configuration parameter is different from a previous relax measurement configuration parameter, enter a parameter update module when current information of the terminal device meets a preset condition, and perform relax measurement by using the current relax measurement configuration parameter when the current information of the terminal device does not meet the preset condition.

Optionally, in some embodiments of the present disclosure, the current information of the terminal device includes: current remaining power capacity, a current mode, a current state, current signal intensity, current signal quality, or a current signal-to-noise ratio.

Optionally, in some embodiments of the present disclosure, the preset condition met by the current information of the terminal device includes: the current remaining power capacity is lower than or equal to a first power capacity threshold; or, the current mode is a night mode; or, the current state is a static state; or, the current signal intensity is higher than or equal to a first signal intensity threshold; or, the current signal quality is higher than or equal to a first signal quality threshold; or, the current signal-to-noise ratio is greater than or equal to a first signal-to-noise ratio threshold.

Optionally, in some embodiments of the present disclosure,
the processor 680 is specifically configured to, under the condition that the current relax measurement configuration parameter includes a current search power difference parameter, perform relax measurement by using the previous search power difference parameter when the current search power difference parameter is less than a previous search power difference parameter, and perform relax measurement by using the current search power difference parameter when the current search power difference parameter is greater than or equal to the previous search power difference parameter; or,
the processor 680 is specifically configured to, under the condition that the current relax measurement configuration parameter includes a current search intensity threshold parameter, perform relax measurement by using the current search intensity threshold parameter when the current search intensity threshold parameter is less than a previous search intensity threshold parameter, and perform relax measurement by using the previous search intensity threshold parameter when the current search intensity threshold parameter is greater than or equal to the previous search intensity threshold parameter; or,
the processor 680 is specifically configured to, under the condition that the current relax measurement configuration parameter includes a current relax measurement condition parameter, perform relax measurement by using the current relax measurement condition parameter when the current relax measurement condition parameter meets a condition of low mobility or not at cell edge, and perform relax measurement by using a previous relax measurement condition parameter when the current relax measurement condition parameter does not meet the condition of low mobility or not at cell edge; or,
the processor 680 is specifically configured to, under the condition that the current relax measurement configuration parameter includes a current high priority relax measurement parameter, perform, by the terminal device, relax measurement by using the current high priority relax measurement parameter when the current high priority relax measurement parameter is equal to a preset value, and perform, by the terminal device, relax measurement by using a previous high priority relax measurement parameter when the current high priority relax measurement parameter is not equal to the preset value.

Optionally, in some embodiments of the present disclosure, the processor 680 is specifically configured to, under the condition that the current remaining power capacity of the terminal device is higher than or equal to a second power capacity threshold, and the second power capacity threshold is greater than the first power capacity threshold, or, under the condition that the current mode of the terminal device is not the night mode, or, under the condition that the current state of the terminal device is not the static state, perform relax measurement by using the current relax measurement configuration parameter.

Optionally, in some embodiments of the present disclosure, the processor 680 is specifically configured to, under the condition that the current signal intensity of the terminal device is lower than or equal to a second signal intensity threshold, and the second signal intensity threshold is less than the first signal intensity threshold, or, under the condition that the current signal quality of the terminal device is lower than or equal to a second signal quality threshold, and the second signal quality threshold is less than the first signal quality threshold, or, under the condition that the current signal-to-noise ratio of the terminal device is less than or equal to a second signal-to-noise ratio threshold, and the second signal-to-noise ratio threshold is less than the first signal-to-noise ratio threshold, perform second parameter update processing.

Optionally, in some embodiments of the present disclosure, the processor 680 is specifically configured to, under the condition that the current relax measurement configuration parameter includes the current search power difference parameter, perform relax measurement by using the current search power difference parameter when the current search power difference parameter is less than the previous search power difference parameter, and perform relax measurement by using the previous search power difference parameter when the current search power difference parameter is greater than or equal to the previous search power difference parameter; or, the processor 680 is specifically configured to, under the condition that the current relax measurement configuration parameter includes the current search intensity threshold parameter, perform relax measurement by using the previous search intensity threshold parameter when the current search intensity threshold parameter is less than the previous search intensity threshold parameter, and perform relax measurement by using the current search intensity threshold parameter when the current search intensity threshold parameter is greater than or equal to the previous search intensity threshold parameter; or, the processor 680 is specifically configured to, under the condition that the current relax measurement configuration parameter includes the current relax measurement condition parameter, perform relax measurement by using the previous relax measurement condition parameter when the current relax measurement condition parameter meets the condition of low mobility or not at cell edge, and perform relax measurement by using the current relax measurement condition parameter when the current relax measurement condition parameter does not meet the condition of low mobility or not at cell edge; or, the processor 680 is specifically configured to, under the condition that the current relax measurement configuration parameter includes the current high priority relax measurement parameter, perform relax measurement by using the previous high priority relax measurement parameter when the current high priority relax measurement parameter is equal to a preset value, and perform relax measurement by using the current high priority relax measurement parameter when the current high priority relax measurement parameter is not equal to the preset value.

Optionally, in some embodiments of the present disclosure, the processor 680 is specifically configured to, under the condition that the current remaining power capacity is higher than the first power capacity threshold and is lower than the second power capacity threshold, or, under the condition that the current signal intensity is higher than the second signal intensity threshold and is lower than the first signal intensity threshold, or, under the condition that the current signal quality is higher than the second signal quality threshold and is lower than the first signal quality threshold, or, under the condition that the current signal-to-noise ratio is greater than the second signal-to-noise ratio threshold and is less than the first signal-to-noise ratio threshold, perform relax measurement by using the previous relax measurement configuration parameter.

In the above embodiments, all or part of them may be implemented by means of software, hardware, firmware, or any combination thereof. When implemented by means of the software, all or part of the embodiments may be implemented in the form of a computer program product.

The computer program product includes one or more computer instructions. When the computer program instructions are loaded and executed on a computer, all or part of processes or functions as described in the embodiments of the present disclosure are generated. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from one website, computer, server or data center to another website, computer, server or data center in a wired mode (such as a coaxial cable, an optical fiber, and a digital subscriber line (DSL)) or a wireless mode (such as infrared rays, radios, and microwaves). The computer-readable storage medium may be any available medium that can be stored in a computer, or a data storage device including a server, a data center and the like formed by integrating one or more available media. The available medium may be a magnetic medium (such as a floppy disk, a hard disk, or a magnetic tape), an optical medium (such as a digital video disk (DVD)), or a semiconductor medium (such as a solid state disk (SSD)).

Those skilled in the art may clearly understand that for the convenience and simplicity of description, the specific working processes of the system, device and unit as described above may refer to the corresponding processes in the embodiment of the foregoing method, and will not be repeated here.

In several embodiments provided by the present disclosure, it should be understood that the disclosed system, device and method may be implemented in other ways. For example, the embodiment of the device as described above is only schematic. For example, the division of the unit is only a logical function division, and there may be another division when it is actually implemented. For example, a plurality of units or components may be combined or integrated into another system, or some features may be ignored or not performed. Besides, mutual coupling or direct coupling or communication connection shown or discussed may be indirect coupling or communication connection via some interfaces, devices or units, and may be in an electrical form, a mechanical form, or other forms.

The units described as separated components may or may not be physically separated, and components displayed as units may or may not be physical units, that is to say, they may be positioned in one place or may also be distributed on a plurality of network units. Part or all of the units may be selected according to actual needs to achieve the objective of this embodiment.

In addition, the functional units in the embodiments of the present disclosure may be integrated in one processing unit, or the units may physically exist independently, or two or more units may be integrated in one unit. The above integrated unit may be implemented in the form of hardware or a software functional unit.

If the integrated unit is implemented in the form of the software functional unit and is sold or used as an independent product, it may be stored in one computer-readable storage medium. Based on such understanding, the technical solution of the present disclosure essentially or part that contributes to the prior art or all or part of the technical solution may be reflected in the form of a software product. The computer software product is stored in one storage medium, and includes a plurality of instructions configured for causing a computer device (which may be a personal computer, a server, or a network device) to perform all or part of steps in the method described in the embodiment of the present disclosure. The foregoing storage medium includes various media that may store program codes, such as a U disk, a mobile hard disk, a read-only memory (ROM), a random access memory (RAM), a diskette, or a compact disc.

As mentioned above, the above embodiments are only intended to illustrate rather than to limit the technical solutions of the present disclosure. Although the present disclosure is described in detail with reference to the foregoing embodiments, those of ordinary skill in the art should understand that they may still make modifications to the technical solutions recorded in the foregoing embodiments, or make equivalent substitutions to part of the technical features. However, these modifications or substitutions do not cause the essence of the corresponding technical solutions to depart from the spirit and scope of the technical solutions in the embodiments of the present disclosure. The technical solutions in the embodiments of the present disclosure will be described below in conjunction with the accompanying drawings in the embodiments of the present disclosure. Apparently, the described embodiments are only part rather than all of the embodiments of the present disclosure. All other embodiments obtained by those skilled in the art on the basis of the embodiments in the present disclosure without creative efforts shall fall within the scope of protection of the present disclosure.

What is claimed is:

1. A method for processing a relaxed measurement parameter update, comprising:
   receiving, by a terminal device, a system information sent by a network device, the system information comprising a current relaxed measurement configuration parameter;
   performing the following steps based on a plurality of conditions,
   Step1:
   i) performing, by the terminal device, a first parameter update processing,
      when the current relaxed measurement configuration parameter is different from a previous relaxed measurement configuration parameter and
      when current information of the terminal device meets a preset condition, and
   ii) performing, by the terminal device, one of the following;
   a) a relaxed measurement by using the previous relaxed measurement configuration parameter or the current relaxed measurement configuration parameter, and
   b) a second parameter update processing,
      when the current relaxed measurement configuration parameter is different from the previous relaxed measurement configuration parameter and
      when current information of the terminal device does not meet the preset condition,
   wherein the first parameter update processing comprising:
      keeping the previous relaxed measurement configuration parameter, or
      updating the current relaxed measurement configuration parameter;
   wherein when the first parameter update processing comprising the step of keeping the previous relaxed measurement configuration parameter, the second parameter update processing comprising: updating the current relaxed measurement configuration parameter, and
   when the first parameter update processing comprising the step of updating the current relaxed measurement configuration parameter, the second parameter update processing comprising: keeping the previous relaxed measurement configuration parameter,
   wherein the current information of the terminal device comprises at least one of the following:
      current remaining power capacity, a current mode, a current state, current signal intensity, current signal quality, and a current signal-to-noise ratio,
   wherein the preset condition met by the current information of the terminal device comprises at least one of the following:
      the current remaining power capacity is lower than or equal to a first power capacity threshold,
      the current mode is a night mode,
      the current state is a static state,
      the current signal intensity is higher than or equal to a first signal intensity threshold,
      the current signal quality is higher than or equal to a first signal quality threshold, and
      the current signal-to-noise ratio is greater than or equal to a first signal-to-noise ratio threshold,
   wherein the performing, by the terminal device, the first parameter update processing (Step 1, i above) comprises one of the following:
      i) when the current relaxed measurement configuration parameter comprises a current search power difference parameter, performing, by the terminal device, relaxed measurement by using the previous search power difference parameter when the current search power difference parameter is less than a previous search power difference parameter, and performing, by the terminal device, relaxed measurement by using the current search power difference parameter when the current search power difference parameter is greater than or equal to the previous search power difference parameter, ii) when the current relaxed measurement configuration parameter comprises a current search intensity threshold parameter, performing, by the terminal device, relaxed measurement by using the current search intensity threshold parameter when the current search intensity threshold parameter is less than a previous search intensity threshold parameter, and performing, by the terminal device, relaxed measurement by using the previous search intensity threshold parameter when the current search intensity threshold parameter is greater than or equal to the previous search intensity threshold parameter, iii) when the current relaxed measurement configuration parameter comprises a current relaxed measurement condition parameter, performing, by the terminal device, relaxed measurement by using the current relaxed measurement condition parameter when the current relaxed measurement condition parameter meets a condition of low mobility or not at cell edge, and performing, by the terminal device, relaxed measurement by using a previous relaxed measurement condition parameter when the current relaxed measurement condition parameter does not meet the condition of low mobility or not at cell edge, iv) when the current relaxed measurement configuration parameter comprises a current high priority relaxed measurement parameter, performing, by the terminal device, relaxed measurement by using the current high priority relaxed measurement parameter when the current high priority relaxed measurement parameter is equal to a preset value, and performing, by the terminal device, relaxed measurement by using a previous high priority relaxed measurement parameter when the current high priority relaxed measurement parameter is not equal to the preset value, wherein the performing, by the terminal device, the relaxed measurement by using the current relaxed measurement configuration parameter when one of a, b and c conditions shown below is met, or the previous relaxed measurement configuration parameter when one of d, e, f and g conditions shown below is met, or the performing, by the terminal device, the second parameter update processing when one of h, i and j conditions shown below is met (Step 1, ii above), comprises one of the following:

i) performing, by the terminal device, relaxed measurement by using the current relaxed measurement configuration parameter when one of the following:

a) when the current remaining power capacity of the terminal device is higher than or equal to a second power capacity threshold, and the second power capacity threshold is greater than the first power capacity threshold, b) when the current mode of the terminal device is not the night mode, and c) when the current state of the terminal device is not the static state, ii) performing, by the terminal device, relaxed measurement by using the previous relaxed measurement configuration parameter when one of the following:

d) when the current remaining power capacity is higher than the first power capacity threshold and is lower than the second power capacity threshold, e) when the current signal intensity is higher than the second signal intensity threshold and is lower than the first signal intensity threshold, f) when the current signal quality is higher than the second signal quality threshold and is lower than the first signal quality threshold, and g) when the current signal-to-noise ratio is greater than the second signal-to-noise ratio threshold and is less than the first signal-to-noise ratio threshold, and the second signal-to-noise ratio threshold is less than the first signal-to-noise ratio threshold, iii) performing, by the terminal device, the second parameter update processing when one of the following:

h) when the current signal intensity of the terminal device is lower than or equal to the second signal intensity threshold, or, i) when the current signal quality of the terminal device is lower than or equal to the second signal quality threshold, and j) when the current signal-to-noise ratio of the terminal device is less than or equal to the second signal-to-noise ratio threshold, wherein the performing, by the terminal device, the second parameter update processing comprises:

i) when the current relaxed measurement configuration parameter comprises the current search power difference parameter, performing, by the terminal device, relaxed measurement by using the current search power difference parameter when the current search power difference parameter is less than the previous search power difference parameter, and performing, by the terminal device, relaxed measurement by using the previous search power difference parameter when the current search power difference parameter is greater than or equal to the previous search power difference parameter, ii) when the current relaxed measurement configuration parameter comprises the current search intensity threshold parameter, performing, by the terminal device, relaxed measurement by using the previous search intensity threshold parameter when the current search intensity threshold parameter is less than the previous search intensity threshold parameter, and performing, by the terminal device, relaxed measurement by using the current search intensity threshold parameter when the current search intensity threshold parameter is greater than or equal to the previous search intensity threshold parameter, iii) when the current relaxed measurement configuration parameter comprises the current relaxed measurement condition parameter, performing, by the terminal device, relaxed measurement by using the previous relaxed measurement condition parameter when the current relaxed measurement condition parameter meets the condition of low mobility or not at cell edge, and performing, by the terminal device, relaxed measurement by using the current relaxed measurement condition parameter when the current relaxed measurement condition parameter does not meet the condition of low mobility or not at cell edge or iv) when the current relaxed measurement configuration parameter comprises the current high priority relaxed measurement parameter, performing, by the terminal device, relaxed measurement by using the previous high priority relaxed measurement parameter when the current high priority relaxed measurement parameter is equal to a preset value, and performing, by the terminal device, relaxed measurement by using the current high priority relaxed measurement parameter when the current high priority relaxed measurement parameter is not equal to the preset value.

2. A non-transitory computer-readable storage medium, comprising an instruction that, when run on a computer, causes the computer to perform the method according to claim 1.

3. A terminal device, comprising:
a transceiver module configured to receive system information sent by a network device, the system information including a current relaxed measurement configuration parameter;
a processing module configured to perform the following steps based on a plurality of conditions, Step 1:
i) perform a first parameter update processing,
when the current relaxed measurement configuration parameter is different from a previous relaxed measurement configuration parameter and when current information of the terminal device meets a preset condition,
wherein the first parameter update processing comprising:
keeping the previous relaxed measurement configuration parameter, or
updating the current relaxed measurement configuration parameter;
ii) perform one of the following;
a) a relaxed measurement by using the previous relaxed measurement configuration parameter or the current relaxed measurement configuration parameter, and
b) a second parameter update processing;
when the current relaxed measurement configuration parameter is different from the previous relaxed measurement configuration parameter and when current information of the terminal device does not meet the preset condition,
wherein, when the first parameter update processing comprising the step of keeping the previous relaxed measurement configuration parameter, the second parameter update processing comprising: updating the current relaxed measurement configuration parameter; and
when the first parameter update processing comprising the step of updating the current relaxed measurement configuration parameter, the second parameter update processing comprising: keeping the previous relaxed measurement configuration parameter;
wherein the current information of the terminal device comprises: current remaining power capacity, a current mode, a current state, current signal intensity, current signal quality, and a current signal-to-noise ratio;

wherein the preset condition met by the current information of the terminal device comprises at least one of the following:
the current remaining power capacity is lower than or equal to a first power capacity threshold,
the current mode is a night mode,
the current state is a static state,
the current signal intensity is higher than or equal to a first signal intensity threshold,
the current signal quality is higher than or equal to a first signal quality threshold, and
the current signal-to-noise ratio is greater than or equal to a first signal-to-noise ratio threshold,
wherein, by the processing module, the first parameter update processing (Step 1, i above) comprises one of the following:
i) when the current relaxed measurement configuration parameter comprises a current search power difference parameter,
performing, relaxed measurement by using the previous search power difference parameter when the current search power difference parameter is less than a previous search power difference parameter, and
performing, relaxed measurement by using the current search power difference parameter when the current search power difference parameter is greater than or equal to the previous search power difference parameter,
under the second condition that ii) when the current relaxed measurement configuration parameter comprises a current search intensity threshold parameter,
performing, relaxed measurement by using the current search intensity threshold parameter when the current search intensity threshold parameter is less than a previous search intensity threshold parameter, and
performing, relaxed measurement by using the previous search intensity threshold parameter when the current search intensity threshold parameter is greater than or equal to the previous search intensity threshold parameter,
iii) when the current relaxed measurement configuration parameter comprises a current relaxed measurement condition parameter,
performing, relaxed measurement by using the current relaxed measurement condition parameter when the current relaxed measurement condition parameter meets a condition of low mobility or not at cell edge, and
performing, relaxed measurement by using a previous relaxed measurement condition parameter when the current relaxed measurement condition parameter does not meet the condition of low mobility or not at cell edge,
iv) when the current relaxed measurement configuration parameter comprises a current high priority relaxed measurement parameter,
performing, relaxed measurement by using the current high priority relaxed measurement parameter when the current high priority relaxed measurement parameter is equal to a preset value, and
performing, relaxed measurement by using a previous high priority relaxed measurement parameter when the current high priority relaxed measurement parameter is not equal to the preset value, wherein the perform, by the terminal device, the relaxed measurement by using the current relaxed measurement configuration parameter when one of a, b and c conditions shown below is met, or the previous relaxed measurement configuration parameter when one of d, e, f and g conditions shown below is met, or the perform, by the terminal device, the second parameter update processing when one of h, i and j conditions shown below is met (Step 1, ii above), comprises one of the following:
i) perform the relaxed measurement by using the current relaxed measurement configuration parameter when one of the following:
   a) when the current remaining power capacity of the terminal device is higher than or equal to a second power capacity threshold, and the second power capacity threshold is greater than the first power capacity threshold,
   b) when the current mode of the terminal device is not the night mode, and
   c) when the current state of the terminal device is not the static state,
ii) perform the relaxed measurement by using the previous relaxed measurement configuration parameter when one of the following:
   d) when the current remaining power capacity is higher than the first power capacity threshold and is lower than the second power capacity threshold,
   e) when the current signal intensity is higher than the second signal intensity threshold and is lower than the first signal intensity threshold,
   f) when the current signal quality is higher than the second signal quality threshold and is lower than the first signal quality threshold, and
   g) when the current signal-to-noise ratio is greater than the second signal-to-noise ratio threshold and is less than the first signal-to-noise ratio threshold, and the second signal-to-noise ratio threshold is less than the first signal-to-noise ratio threshold,
iii) perform the second parameter update processing when one of the following:
   h) when the current signal intensity of the terminal device is lower than or equal to the second signal intensity threshold,
   i) when the current signal quality of the terminal device is lower than or equal to a second signal quality threshold, and
   j) when the current signal-to-noise ratio of the terminal device is less than or equal to a second signal-to-noise ratio threshold, wherein, by the processing module, the second parameter update processing comprises:
i) when the current relaxed measurement configuration parameter comprises the current search power difference parameter,
   performing, relaxed measurement by using the current search power difference parameter when the current search power difference parameter is less than the previous search power difference parameter, and
   performing, relaxed measurement by using the previous search power difference parameter when the current search power difference parameter is greater than or equal to the previous search power difference parameter,
ii) when the current relaxed measurement configuration parameter comprises the current search intensity threshold parameter,
   performing, relaxed measurement by the previous search intensity threshold parameter when the current search intensity threshold parameter is less than the previous search intensity threshold parameter, and
   performing, relaxed measurement by using the current search intensity threshold parameter when the current search intensity threshold parameter is greater than or equal to the previous search intensity threshold parameter,
iii) when the current relaxed measurement configuration parameter comprises the current relaxed measurement condition parameter,
   performing, relaxed measurement by using the previous relaxed measurement condition parameter when the current relaxed measurement condition parameter meets the condition of low mobility or not at cell edge, and
   performing, relaxed measurement by using the current relaxed measurement condition parameter when the current relaxed measurement condition parameter does not meet the condition of low mobility or not at cell edge, or
iv) when the current relaxed measurement configuration parameter comprises the current high priority relaxed measurement parameter,
   performing, relaxed measurement by using the previous high priority relaxed measurement parameter when the current high priority relaxed measurement parameter is equal to a preset value, and
   performing, relaxed measurement by using the current high priority relaxed measurement parameter when the current high priority relaxed measurement parameter is not equal to the preset value.

* * * * *